United States Patent [19]

Epple et al.

[11] Patent Number: 4,817,236
[45] Date of Patent: Apr. 4, 1989

[54] STROKE-CONTROLLED WINDSHIELD WIPER UNIT FOR MOTOR VEHICLES

[75] Inventors: Anton Epple, Rottenburg; Hans Trube, Herrenberg; Martin Pfeiffer, Stuttgart, all of Fed. Rep. of Germany

[73] Assignee: Daimler-Benz Aktiengesellschaft, Stuttgart, Fed. Rep. of Germany

[21] Appl. No.: 82,224

[22] Filed: Aug. 6, 1987

[30] Foreign Application Priority Data

Aug. 6, 1986 [DE] Fed. Rep. of Germany ....... 3626642

[51] Int. Cl.⁴ ................................................ B60S 1/16
[52] U.S. Cl. ................................. 15/250.34; 15/250.21
[58] Field of Search ............ 15/250.31, 250.34, 250.21, 15/250.20, 250.22, 250.23, 250.27, 250.19, 250.29, 250.30, 250.32, 250.33

[56] References Cited

U.S. PATENT DOCUMENTS

| | | | |
|---|---|---|---|
| 2,324,894 | 7/1943 | Whitted | 15/250.23 |
| 2,600,622 | 6/1952 | Dahlgren | 15/250.27 |
| 2,856,212 | 10/1958 | Sacchini | 15/250.34 |
| 4,018,459 | 4/1977 | Mominee et al. | 285/5 |
| 4,550,469 | 11/1985 | Deutscher et al. | 15/250.34 |
| 4,642,838 | 2/1987 | Fuzita et al. | 15/250.23 |

FOREIGN PATENT DOCUMENTS

| | | | |
|---|---|---|---|
| 466618 | 7/1950 | Canada | 15/250.34 |
| 2417128 | 10/1975 | Fed. Rep. of Germany . | |

*Primary Examiner*—Harvey C. Hornsby
*Assistant Examiner*—Joseph S. Machuga
*Attorney, Agent, or Firm*—Barnes & Thornburg

[57] ABSTRACT

A stroke-controlled windshield wiper unit having a gear casing, screw-connected rotationally solidly to a drive unit which can be mounted on the vehicle independently of the drive shaft by a drive shaft rotationally solidly connected to a stroke mechanism of the wiper. The drive shaft is designed as a hollow shaft which accepts a threaded bolt passing through it. The head of the threaded bolt is located at the gear casing end to allow assembly to previously installed windshield.

2 Claims, 2 Drawing Sheets

STROKE-CONTROLLED WINDSHIELD WIPER UNIT FOR MOTOR VEHICLES

BACKGROUND AND SUMMARY OF THE INVENTION

The invention relates generally to a stroke-controlled windshield wiper unit for motor vehicle and more specifically to a wiper unit having a gear casing, including a stroke mechanism of the wipers which is rotationally solidly screw connected to a drive unit by a drive shaft rotationally solidly connected to the stroke mechanism of the wiper.

A windshield wiper unit of this type is shown in German Patent Specification No. 2,417,128. In this case, the gear casing is mounted to the drive unit before mounting to the vehicle.

The fitting of such a windsheld wiper unit can involve difficulties if the drive unit has to be fitted into the vehicle first and the gear casing is only fitted subsequently. Under certain circumstances, the internal screw connection of the gear housing and drive shaft to the drive unit cannot be reached or can only be reached with difficulty.

Thus, it is an object of the present invention to provide a windshield wiper unit wherein the gear casing can also be fitted directly as the conclusion of an assembly operation. Another object is to provide a windshield wiper unit that allows fitting and removal without difficulty in cases where a vehicle windshield has already been installed.

These and other objects are achieved in accordance with the invention with the drive shaft being a hollow shaft which accepts a threaded bolt passing through it, the head of which bolt being located at the gear casing head. The drive shaft and the drive unit have intermeshing splines to form the solid rotational connection. Means are provided for limiting axial displacement of the drive unit when it is being screwed to the gear casing by the bolt. A hexagon socket is provided in the head of the bolt. Thus, the gear casing, stroke mechanism and drive shaft may be fitted to the drive unit easily at any stage of installation.

Other objects, advantages and novel features of the present invention will become apparent from the following detailed description of the invention when considered in conjunction with the accompanying drawings.

DETAILED DESCRIPTION OF THE DRAWINGS

Figure 1:
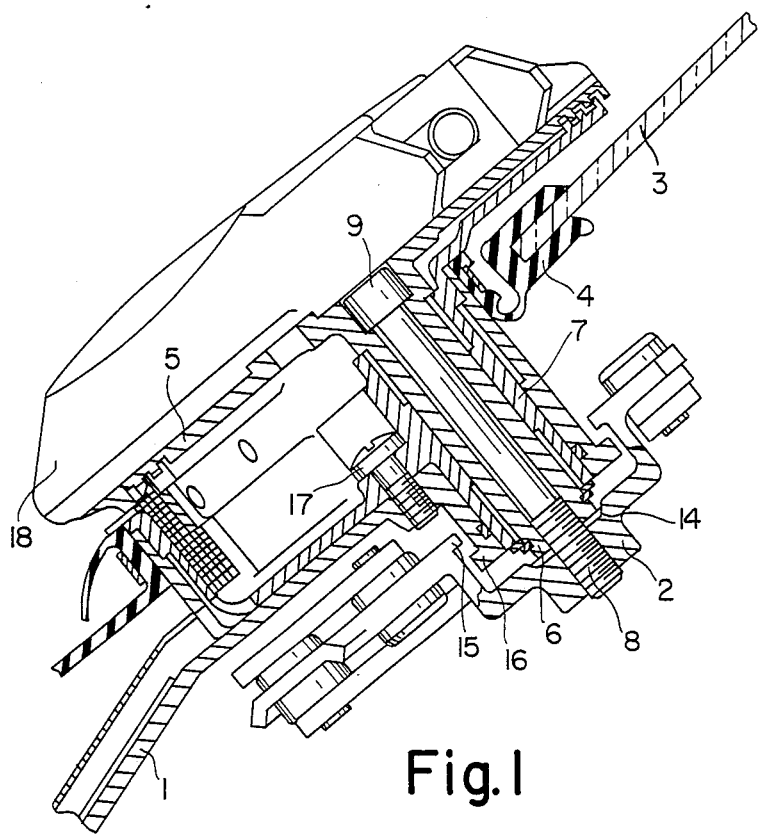
FIG. 1 is a sectional view through an installed windshield wiper unit.
Figure 2:
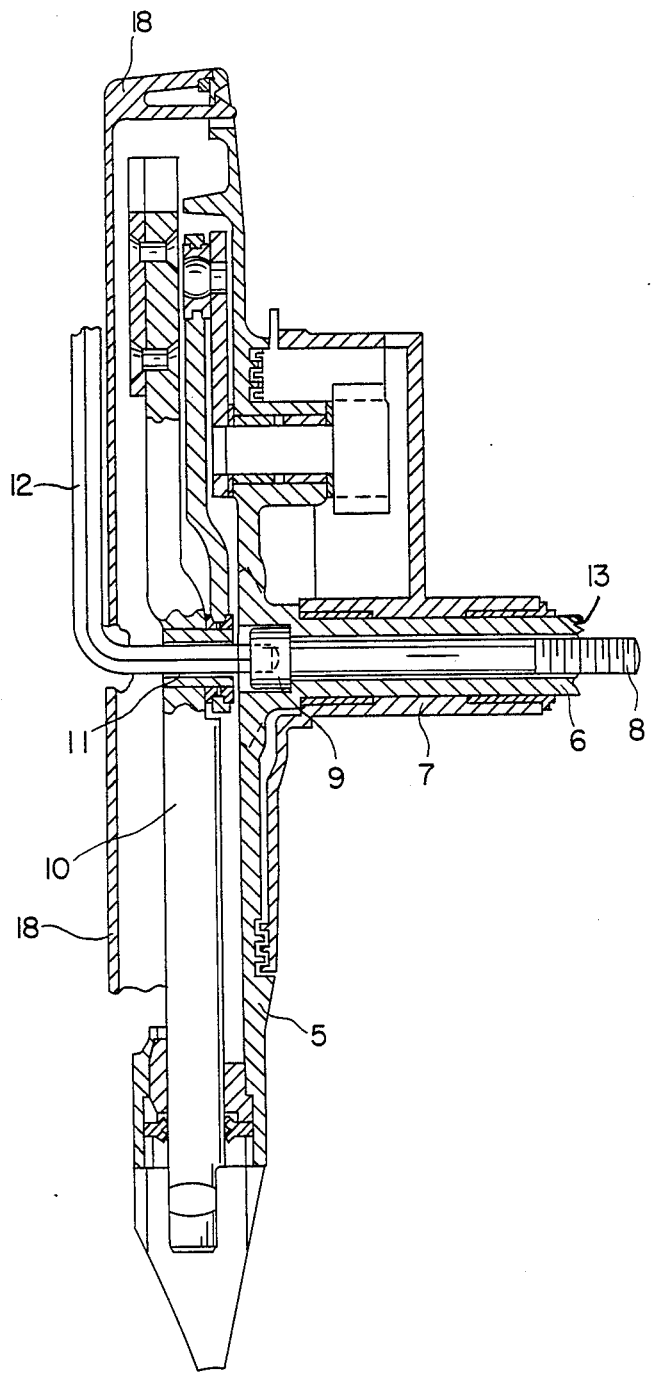
FIG. 2 is a sectional view of the gear casing and the drive shaft before assembly with the drive unit.

A drive unit 2, including a drive motor which is not shown, is fastened to the vehicle via a base plate 1. The windshield 3 with a lower seal 4 may be also fitted to the baseplate 1 at this time.

A gear casing 5 with a drive shaft rotationally solidly connected thereto and an adaptor 7 are then introduced as a preassembled unit into the drive unit 2. The gear casing 5 and drive shaft 6 in the embodiment shown are designed as one piece. The drive shaft 6 is designed as a hollow shaft and accepts a threaded bolt 8, which is introduced from the gear casing end of the assembly. A head 9 of bolt 8 has a hexagon socket. A connecting rod 10 of the stroke mechanism is supported in the gear casing 5 after insertion of the bolt 8 in drive shaft 6. The hole in connecting rod 10 is used later for inserting a hexagon socket key 12 into the hexagon socket of bolt 8.

The drive shaft 6 has splines 13 at its free end which interact with mating splines 14 on the drive unit 2 to form a solid rotational connection.

Using a hexagonal socket key 12, threaded bolt 8 is screwed into drive unit 2. Thus, the gear casing 5 is rotationally solidly connected to the drive unit 2 by the threaded bolt 8 and mating splines 13 and 14. Attention is given to ensure that the drive unit 2 is located by toes 15, 16 in such a position that they limit axial displacement of the drive unit 2 during the screwing operation.

The fixed or non-rotational adaptor 7 and the base plate 1 can be subsequently connected by screws 17.

Finally, it should be noted that it is only possible to introduce the hexagon socket key 12 through hole 11 and into head 9 at a particular position of the connection rod 10. This assures that the connecting rod 10, drive shaft 6 and drive unit 2 have a specific angular relationship before the splines 13 and 14 mate. Thus, incorrect fitting which would otherwise be possible, if avoided.

In order to conclude the fitting procedure, the gear casing is closed by a clip-on cap 18.

Since the bolt 8 is accessible and manipulated from the gear casing side of the assemble, the gear casing, stroke mechanism and drive shaft may be aligned, fitted and assembled to the drive unit at any stage of assembly of the unit and its mounting to the vehicle.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Stroke controlled windshield wiper unit for a motor vehicle comprising:
   a gear casing including a hollow drive shaft;
   a stroke mechanism for a wiper in said gear casing;
   a drive unit having splines;
   the hollow drive shaft of said gear casing being solidly rotationally connected to said stroke mechanism and having splines;
   a threaded fastener means, having a head located at one end, passing through said hollow drive shaft and being threadedly received in said drive unit for solidly rotationally connecting said hollow drive shaft to said drive unit via intermeshing their splines; and
   means directly adjacent said hollow drive shaft for limiting axial displacement of said drive unit when it is being screwed to said gear casing by said threaded fastener means.

2. Windsheld wiper unit according to claim 1, wherein the head of said threaded fastener means has a hexagon socket.

* * * * *